(12) United States Patent
Yarnell

(10) Patent No.: US 9,992,342 B1
(45) Date of Patent: Jun. 5, 2018

(54) SYSTEM FOR PROVIDING REMOTE EXPERTISE

(71) Applicant: Bluestream Health, Inc., New York, NY (US)

(72) Inventor: Brian Eric Yarnell, New York, NY (US)

(73) Assignee: Bluestream Health, Inc., New York, NY (US)

( * ) Notice: Subject to any disclaimer, the term of this patent is extended or adjusted under 35 U.S.C. 154(b) by 0 days. days.

(21) Appl. No.: 15/233,389

(22) Filed: Aug. 10, 2016

Related U.S. Application Data

(60) Provisional application No. 62/203,593, filed on Aug. 11, 2015.

(51) Int. Cl.
| | | |
|---|---|---|
| H04M 3/00 | (2006.01) |
| H04M 5/00 | (2006.01) |
| H04M 3/523 | (2006.01) |
| H04M 3/51 | (2006.01) |
| G06Q 10/06 | (2012.01) |

(52) U.S. Cl.
CPC .. *H04M 3/5233* (2013.01); *G06Q 10/063112* (2013.01); *H04M 3/5125* (2013.01); *H04M 3/5183* (2013.01); *H04M 3/5238* (2013.01)

(58) Field of Classification Search
CPC ............. H04M 3/5233; H04M 3/5232; H04M 3/5183; H04M 3/51
USPC ............ 379/265.12, 265.11, 265.05, 265.01, 379/266.01
See application file for complete search history.

(56) References Cited

U.S. PATENT DOCUMENTS

| | | | |
|---|---|---|---|
| 6,553,113 B1 * | 4/2003 | Dhir ...................... | H04M 3/493 379/265.02 |
| 7,590,550 B2 | 9/2009 | Schoenberg | |
| 8,612,272 B1 * | 12/2013 | Aykin .................. | G06Q 10/063 705/7.11 |
| 8,799,010 B2 | 8/2014 | Kaundinya et al. | |
| 2001/0024497 A1 * | 9/2001 | Campbell ........... | H04M 3/5125 379/265.09 |
| 2013/0246084 A1 | 9/2013 | Parmanto et al. | |

* cited by examiner

*Primary Examiner* — Thjuan K Addy
(74) *Attorney, Agent, or Firm* — Brenda Pomerance

(57) ABSTRACT

Expertise, such as foreign language interpretation, is delivered to requestors by an expertise-provisioning system that brokers requests between the requestors and experts affiliated with virtual call centers.

20 Claims, 8 Drawing Sheets

*FIG. 3A*

ENTER INFORMATION ABOUT SESSION
(REQUESTER)

Department: Maternity ▼
Patient ID: 123456 ▼
Patient Gender: Female ▼

[Request an Expert]

*FIG. 3B*

PLEASE SELECT A REMOTE EXPERT
(REQUESTER)

Spanish Interpreter
VIDEO CALL
30 SECOND WAIT
[Request]

AUDIO CALL
10 SECOND WAIT
[Request]

French Interpreter
VIDEO CALL
45 SECOND WAIT
[Request]

AUDIO CALL
10 SECOND WAIT
[Request]

Physician Consult
VIDEO CALL
2 MINUTE WAIT
[Request]

AUDIO CALL
2 MINUTE WAIT
[Request]

[Other Experts]

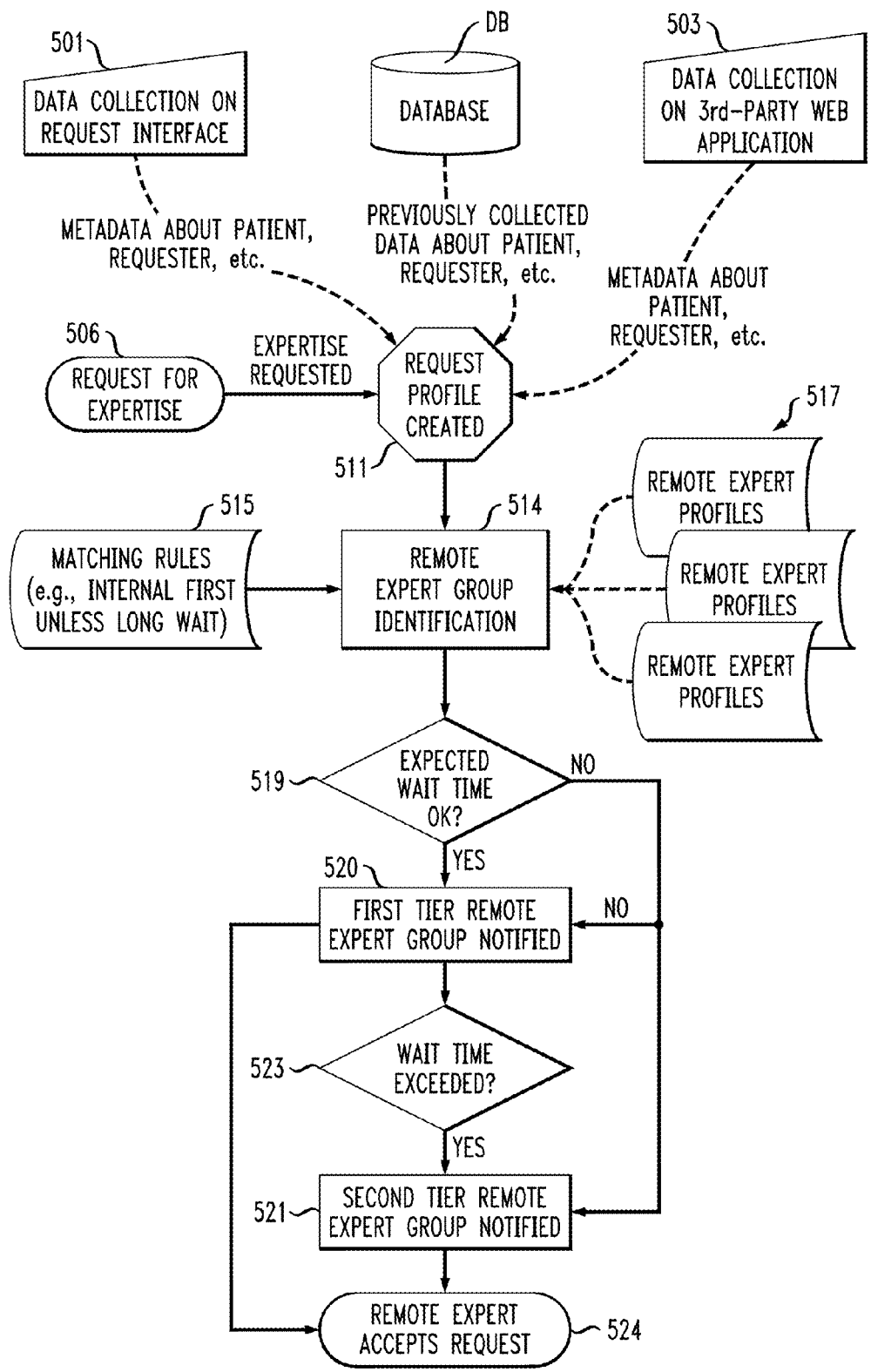

SYSTEM FOR PROVIDING REMOTE EXPERTISE

CROSS-REFERENCE TO RELATED APPLICATION

This application claims the benefit of provisional application Ser. No. 62/203,593 filed Aug. 11, 2015, the disclosure of which is hereby incorporated by reference as though fully set forth herein.

BACKGROUND

Advances in automated access to remote expertise have made resources like foreign language interpreters and health coaches more readily available to people who need such access.

SUMMARY

Although the current model by which real-time expertise is provided to those who need it has enjoyed acceptance in the marketplace, the present inventor has recognized that improvements are desirable and an expertise-provisioning system disclosed herein provides those improvements.

One problem in the prior art is that it is difficult for organizations needing timely access to expertise, such as language interpretation, to fully and/or effectively utilize in-house resources, such as staff interpreters. For example, hospitals might have staffers with "regular" healthcare duties as nurses, aides, administrators but who have foreign language expertise and are on-call to help care-givers communicate with non-English speaking patients.

Use of such staffers for interpretation has, however, proven to be somewhat hit-or-miss because they may be unable to deliver their expertise in a timely manner due to logistics challenges, particularly outside of the hospital. Addressing that issue by hiring full-time interpreters is usually not an effective solution because there may well not be enough demand for interpretation and/or because there may be no in-house expertise in a given language spoken by a particular patient. The resulting situation may cause a hospital or other organization in need of, say, interpretation expertise to contract with a third-party interpretation service. Such services provide 24-hour coverage and can call on experts anywhere in the world to provide interpretation for a vast array of languages, many of which are rarely encountered. The service, either manually or through computerization, attempts to locate and available one of its experts and then instantiates a connection between the request and expert accessed by telephone or video link. Unfortunately, then, the hospital will have foregone the opportunity to use in-house interpretation expertise that might be readily available at the time its needed, thereby losing the opportunity to enjoy the financial benefits of using in-house staff who, as salaried employees providing other functions within the hospital, do not have to be paid anything additional to provide interpretation as may be needed.

Another problem relates to the technology typically used to deliver language interpretation services or other expertise. Services such as those just mentioned typically employ rigid communication networks created by existing technology vendors that prioritize serving up their own personnel or affiliates for a fee. This can result in a less-than-satisfactory ability to dynamically provision the right expertise to the right patients in real time. Moreover, existing technology such as dual-handset phones or video conferencing systems often rely on proprietary hardware, special network configurations and hosted software. Even in cases where these constraints are transparent to the end user, there is a significant cost in terms of both effort and money to put these systems in place and maintain them. In most cases, these systems exist outside the context of care delivery—forcing care providers to take additional steps to access remote expertise such as fetching a special terminal to make a video call.

In many cases, especially when video is involved, a conference room approach is used where both parties are given a virtual room number to join, instead of being directly connected. In any case, there is no ability for these systems to automatically adapt to changes in the landscape of available experts or requirements of the requestor Another problem is timeliness of the delivery of the requested expertise. The experts employed by the contracted-with service provider may be busy, leading to long wait times, and/or no remote expert with the necessary expertise (e.g. a language spoken by relatively few people) may be available at all. Clients could, of course, contract with multiple services, thereby increasing their chances of finding a remote expert who is currently available but having to access multiple providers seriatim is time-consuming and frustrating. Moreover, a requestor being unhappy with a reported wait time of, say, 5 minutes before getting service has no way of knowing whether the second service might have any available appropriate experts and/or what THEIR wait times might be.

The design of existing systems that provide remote, third-party expertise creates vendor lock-in, forcing an institution to offer to patients, say, vertically integrated services and technology that favor the vendor's own resources, often at a higher-than-market-cost. Existing systems do not allow requestors to select which remote experts, or third-party organizations that provide expertise, are presented to users. Instead, they are at the mercy of the technology vendor to select a remote expert on their behalf and have limited options to override this decision to control cost and quality.

The present inventor has realized that yet another limitation of existing systems is that they offer limited options regarding how requestors of expertise and experts are matched up. The most typical scenario is a switchboard approach, where a person or set of rules routes the requestor to a remote expert within a vertically integrated network.

The expertise-provisioning system disclosed herein overcomes many of the foregoing problems in the art.

In particular, the disclosed system provides for open-ended provisioning of relationships between requestors and experts. Specifically, it does not assume a predefined relationship between the expertise-provisioning system and the pool of experts. It can dynamically broker multiple relationships between requestors and experts (or sources of expertise) based on data-driven analytics, as well as allow management of organizations that requestors work for (like hospitals) to control prioritization of routing between experts or sources of expertise, both internally and externally.

In particular embodiments, the expertise-provisioning system is not the actual source of the expertise ultimately delivered to requestors. Rather, the expertise-provisioning system brokers relationships between requestors of expertise and with sources of that requested expertise, which may include both first-party (e.g., in-house) and third-party sources. Specifically, the expertise-provisioning system can optimize the provisioning of remote experts by choosing experts from among a) the internal resources of the system client, meaning the organization or entity that has contracted with the proprietor of the expertise-provisioning system for the services of the expertise-provisioning system as described herein as well as b) third-party expertise vendors based on such criteria as cost, wait times and specialized expertises, per "matching rules" that each system client may have specified.

To this end, the experts are, in particular embodiments, affiliated with so-called virtual call centers, the affiliates of which are not interrelated by particular networking or technological infrastructure and may come onto the expertise-provisioning system from a wide variety of devices. The affiliates of a particular virtual call center are, rather, typically experts whose work is governed by a particular entity ("expertise vendor") that typically functions to do at least one of: on-board and/or manage and/or pay the experts in that virtual call center for their work. This means that the expertise-provisioning system interacts with the experts directly, rather than with an intervening "traditional call center." Having the experts in virtual call centers enables the expertise-provisioning system to select experts on behalf of requestors based on the characteristics of their respective virtual call centers, such as first-party versus third party and cost charged by various expertise vendors for the services of their experts. The affiliates of a particular virtual call center may also be in-house experts employed by the system client.

In particular embodiments, requestors can be availed of the needed expertise based on multiple criteria rather than simply on the single criterion such as the languages to be interpreted in a given encounter. Such criteria can include the selection based on cost, wait time or characteristics about experts such as preferred gender.

The disclosed system allows users to request and receive specific expertise from multiple disparate endpoints from within other (in this example) healthcare tools such as electronic education materials and communication and workflow tools, or simply via a standalone webpage or mobile application.

Particular embodiments allow for requests to be connected to multiple endpoints (both internal and third-party) simultaneously, and in a way that is transparent to users. For example, a nurse needing help in dealing with a psychotic patient who does not speak English may need the simultaneous services of a behavioral health professional and a language interpreter.

DRAWINGS

FIG. 3a through 3d are simplified screen presentations showing an illustrative sequence of screens that may be presented on the display of a device of a requestor accessing the expertise-provisioning system of FIG. 1;

FIG. 5 is a flowchart depicting an illustrative workflow by which experts available on the expertise-provisioning system are matched to expertise requests;

DETAILED DESCRIPTION

Figure 1:
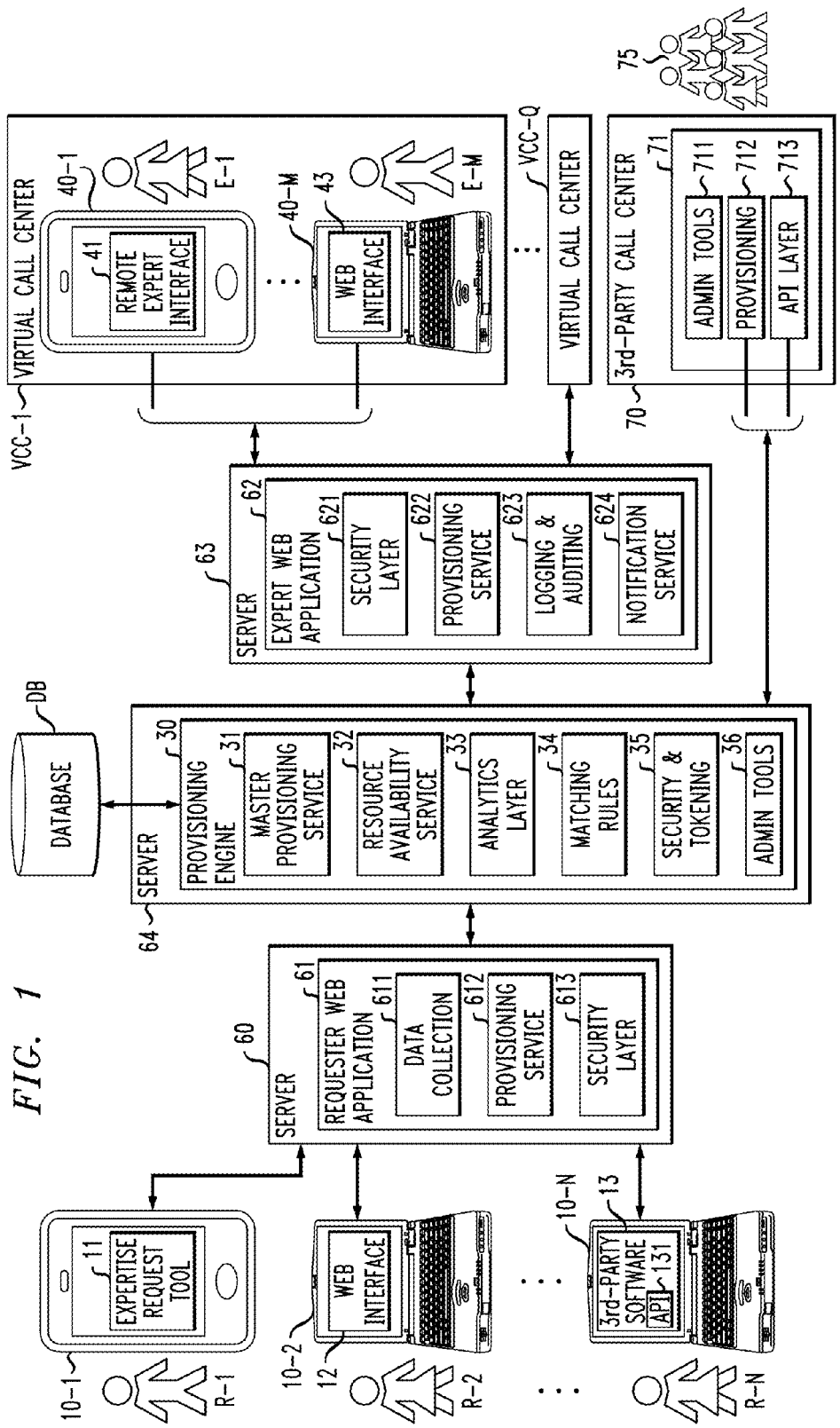
FIG. 1 is a block diagram of an illustrative expertise-provisioning system embodying the principles of the present invention.

FIG. 1 is a block diagram of an illustrative expertise-provisioning system embodying the principles of the present invention. In the disclosed embodiment, the expertise-provisioning system comprises an interrelated set of components that enables a user in need of expertise ("requestor"), e.g., language interpretation, to request that expertise; that automatically brokers relationships with sources of the requested expertise; and that enables the requestor to be put in electronic communication with a particular expert, illustratively by delivering that expertise in a communication session via one or more communication modalities such as audio, video, text. Also, the expertise-provisioning system of the disclosed embodiment can execute a secure transfer of data such as, in a healthcare context, patient demographics and medical history transferred to a healthcare expert.

The system disclosed herein as implementing the principles of the invention is feature-rich and, in particular, features real-time ecosystem awareness. Specifically, the particular system disclosed herein maintains real-time visibility of resources on network across multiple virtual and real call centers. It provides both real-time and forecasted resource availability to requestors prior to making a request, including estimated wait times. It has the ability to drive supply to ecosystem based on forecast and real demand through proactive notifications to potential suppliers of expertise. And it uses data and metadata to automatically control routing of requests to experts including, but not limited to: Connection quality, user ratings, patient-specific data, context-specific data, expert-specific data, and historical call data.

That being said, it is to be understood that the disclosed embodiment is merely illustrative of a system embodying and implementing the principles of the invention as claimed herein. Particular other embodiments implementing the broad inventive concept may be devised that have more, fewer and/or different features than those that happen to be incorporated into the particular illustrative embodiment disclosed herein.

Architecture Overview

In overview, the expertise-provisioning system includes requestor end-user devices 10-1, 10-2 . . . 10-N via which requesting users ("requestors") R-1, R-2 . . . R-N request expertise from the expertise-provisioning system. The expertise-provisioning system also includes remote expert end-user devices ("expert devices") 40-1 . . . 40-N each associated with a respective source of expertise, illustratively one the remote experts E-1 . . . E-M, who are available to provide the requested expertise. Typical examples of the remote experts are foreign language interpreters, physicians, triage nurses, and health coaches.

For example, an English-speaking visiting nurse may be at the home of a patient who speaks Korean but little English and as a result the visiting nurse is having trouble completing a health assessment for the patient. The nurse is able to access the expertise-provisioning system via her smartphone to become connected to a Korean-speaking medical interpreter.

Remote experts E-1 . . . E-M are affiliated with a so-called virtual call center VCC-1. There are actually Q virtual call centers VCC-1 . . . VCC-Q, each having a respective group of affiliated experts, with the possibility that a particular expert may be affiliated with more than one virtual call center. In brief, the experts of a particular virtual call center are experts whose work is governed by a particular entity ("expertise vendor") that typically functions to do at least one of: on-board, and/or manage and/or pay the experts in that virtual call center for their work. Examples of such expertise vendors are companies employing nurse triage and foreign language interpretation experts. Thus, the governance of the experts of many, if not most or all, of the virtual call centers is separate from the governance of the experts of the other virtual call centers.

In addition, the experts of one or more of the virtual call centers may be employed by, or affiliated with, the system client. The "system client" is an organization or entity that has contracted with the proprietor of the expertise-provisioning system for the services of the expertise-provisioning system as described herein. For example, the system client may be a hospital and the experts of its virtual call center—referred to herein as a "first-party" call center—may be hospital employees or affiliates who have foreign language expertise and whose full-time, part-time or just as-needed duties include serving as foreign language interpreters. If desired, the services of the experts of the hospital or other system client can be made available to requestors other than those affiliated with the system client. The system client may specify to the expertise-provisioning system that requestors affiliated with the system client should always given priority over other requestors.

An additional expertise resource can be a traditional third-party call center, such as third-party traditional call center 70 that communicates with the expertise-provisioning system on behalf of the third-party call center's experts.

The expertise-provisioning system also includes provisioning engine 30. This is a highly-scalable application, hosted on a server 64, that maintains real-time awareness of the availability of remote experts or other resources by monitoring availability of such resources across all associated call centers (both virtual and traditional) including estimated wait times. Provisioning engine 30 engages in two-way communications with the requestor devices 10-1, 10-2 . . . 10-N to inform requestors about expertise availability and wait times; accepts requests for connection to experts; notifies appropriate experts of requests; and manages a process by which requestors become connected—illustratively via a WebRTC connection—to experts who have "accepted" their request.

The expertise-provisioning system also includes request web application 61—illustratively comprising an assembly of application program interfaces (API)—hosted on server 60. (As is well known, an API may actually comprise an assembly of interrelated APIs which, together, carry out some overall desired API functionality. For convenience, this description uses the term API both to refer to such assemblies or an individual API.) It is via request web application 61 that the requestors interact with provisioning engine 30. The expertise-provisioning system also includes expert web application 62—also illustratively comprising an API—hosted on server 63. It is via expert web application 62 that the remote experts interact with provisioning engine 30. As will be apparent to those skilled in the art, server 60 and/or server 63 may each actually be a group of servers providing various specialized server functions. Moreover, servers 60 and 63—shown as separate entities in FIG. 1—may actually be a single group of servers hosting both of the web applications 61 and 62.

Architecture Detail

Requestor end-user devices 10-1, 10-2 . . . 10-N may be any type of device by which requestors R-1, R-2 . . . R-N initiate a request for the expertise-provisioning system to provide remote expertise, such as language interpretation. Any given one of the devices 10-1, 10-2 . . . 10-N may be, for example, a smartphone, tablet, laptop or desktop computer or any other suitable end-user device. In fact, any of the devices 10-1, 10-2 . . . 10-N may be a "traditional" landline or mobile telephone having only audio telephone capabilities. In such a case, requests for remote audio expertise can be initiated, for example, by a requestor dialing a specific telephone number for Spanish interpretation and the expertise-provisioning system—carrying out most of the steps described hereinbelow—ultimately provides an audio-only connection to the remote expert or using a web interface as an audio-only call.

A requestor such as requestor R-1 may make a request to provisioning engine 30 via an expertise request tool 11 which is illustratively is a mobile application (app). As an alternative, a requestor such as requestor R-2 may make a request to provisioning engine 30 through request web application 61 via a web interface 12 on a standard web browser. As another alternative, as illustrated for requestor R-N, a similar API expertise request tool may be embedded in third-party software 13 such as educational software or a third-party web application or web page. As an example, a patient may go home after knee surgery and receives an interactive education module about his rehabilitation program. That patient has questions about how to perform certain exercises correctly and presses an "I have questions" button in the education module. This causes an expertise request notification to be transmitted to experts in one or more virtual call centers, as has been previously specified by the healthcare provider ("system client") that is managing the patient's rehabilitation program, based on certain expert-matching rules discussed below. One of the virtual call centers may be a first-party virtual call center whose affiliated experts are physical therapists employed by the healthcare provider itself. Another of the virtual call centers may be operated by a third-party expertise vendor that the healthcare system has authorized to perform work on its behalf.

Request web application 61 collects information from requestors that is used to help the expertise-provisioning system automatically identify one or more appropriate resources on the network, such as one of experts E-1 . . . E-M that could provide the requested expertise. This information may be collected through screen inputs and/or from a database, accessible to request web application 61, in which is stored information about that requestor based, for example, on previous expertise request communication sessions with that requestor. The information in question may include, for example, requestor role (e.g., job title) and context (e.g., identity of the requestor's employer or physical facility or identity of the third-party software or web content through which the requestor initiated the request.) Other collected or previously-stored information may include requestor-specific data such as demographic information, and the requested expertise, e.g., Spanish interpretation. This information-collecting may happen, for example, via expertise request tool 11 or web interface 12 displayed on the requestor's web browser, depending on how the requestor is accessing the expertise-provisioning system. Or in certain cases, where the requestor web application is embedded in a third-party web application or other software, some or all of the foregoing information could be passed directly to request web application 61 from within the web application or other software without requestor input.

Any given one of the expert devices 40-1 . . . 40-M may be, for example, any of the types of devices mentioned above in connection with devices 10-1, 10-2 . . . 10-N. For example, the device 40-1 of remote expert E-1 is illustratively a smartphone. Instantiated in the smartphone is a remote expert interface 41 which, in this example, is a mobile application (app) via which expert E-1 accesses expert web application 62. It is via interactions with expert web application 62 that remote expert E-1, through remote expert interface 41, signs into the expertise-provisioning system and sets her status to "available," thereby enabling provisioning engine 30 to be aware in real time of her availability to take requests, e.g., for language interpretation, and to route requests to her. Alternatively, the expert's identity can be automatically reported to the expertise-provisioning system when the expert signs onto the expertise-provisioning system via third-party software in which expert web application 62 is embedded.

As an alternative to accessing expert web application 62 via expert web interface 41, a remote expert, such as remote expert E-M, may access expert web application 62 via a web interface 43 displayed by on a standard web browser.

Since an expert will have previously been administered into the expertise-provisioning system, relevant information about the expert that will be used by provisioning engine 30 to identify possible experts to fulfill a given request can be looked up from an database that is maintained either by provisioning engine 30 or the expertise vendor with which the expert is question is affiliated, such as a foreign language interpretation provider. This information may include the remote expert's expertise(s) (e.g., languages that the expert can be an interpreter for). It may include also an identification of which of the one or more virtual call centers VCC-1 . . . VCC-Q the expert is affiliated with, and/or expert-specific data such as demographic information (e.g., gender).

Experts may be affiliated with one or more virtual call centers. When an expert signs on to the expertise-provisioning system, she may designate her availability to take requests in her capacity as an affiliate for any one or more of the virtual call centers that she is affiliated with. Consider this example: The expert is a Spanish interpreter affiliated with two virtual call centers A and B. Virtual call center A charges requestors less per minute than virtual call center B and also pays its Interpreters less. At times of day when the expert has learned through experience that requests for interpretation tend to be more infrequent than average, the expert may designate her availability to take requests in her capacity as an affiliate for both virtual call centers A and B because even though virtual call center A will pay her less, some requests will be based on expert-matching rules that, for one reason or another, exclude the higher-paying virtual call center B and she would rather earn something than sit idle. On the other hand, at times of day when the expert has learned through experience that requests for interpretation tend to be more frequent than average, the expert may designate her availability to take requests only in her capacity as an affiliate for the higher-paying virtual call center B because she has found that she will receive enough requests solely as an affiliate of a virtual call center B expert to keep her busy.

It may be appreciated from the foregoing that the expertise-provisioning system proprietor may well have only a technological relationship, and not any financial relationship, with the experts or the expertise vendor. Specifically, in at least certain embodiments, it is envisioned that the expertise-provisioning system proprietor's business relationship will be with the system clients, e.g., hospitals, whereby requestors affiliated with the system client are provided with access the expertise-provisioning system in exchange for financial consideration from the system client to the proprietor of the expertise-provisioning system. A hospital will have previously arranged with, e.g., contracted with, for example, an expertise vendor that is an interpretation company who employs interpreters—various ones of the experts E-1 . . . E-M. In exchange for financial consideration from the system client to the expertise vendor, the latter's experts will be included among the experts that the expertise-provisioning system may connect to in order to provide interpretation services to requestors who a) are healthcare providers (doctors, nurses, aides, etc.) who work within the hospital and/or b) are the hospital's patients and/or c) are other affiliates of the system client who have been authorized by the system client to access the expertise-provisioning system. The patients might be enabled to access the expertise-provisioning system via a bedside tablet supplied by the hospital or via their own personal device which they might use either in the hospital or at home after discharge. The hospital has decided that it is advantageous to access the expertise vendor's interpreters via the expertise-provisioning system because the expertise-provisioning system provides many advantages, as will be appreciated from this description, over the traditional direct-access-to-the-interpretation-company model. The expertise vendor's experts will thereupon gain access to the expertise-provisioning system by being provided with a) appropriate credentials and security tokens (e.g., user names and passwords) and b) an instantiation of remote expert interface 41, e.g., via download, or browser access to expert web application 62.

In another scenario, an expertise vendor may have already affiliated its experts with the expertise-provisioning system and it proposes to new or existing clients, e.g., hospitals, that the clients obtain access to the expertise vendor's experts via the expertise-provisioning system.

As noted above, an additional expertise resource is third-party call center 70. Third-party call center 70 is a traditional call center wherein its experts are logged into the traditional call center's own call center platform 71 managed by its own administrative tools 711. Unlike experts E-1 . . . E-M of virtual call center VCC-1, for example, the experts 75 affiliated with call center platform 70 do not have direct access to expert web application 62 and, as such, experts 75 are not "seen" by the expertise-provisioning system. Rather the availability of resources of traditional call center 70 is made known to provisioning engine 30 via an API layer 713 instantiated on call center platform 71. Requests for expertise communicated to traditional call center 70 from provisioning engine 30 are matched to remote experts affiliated with traditional call center 70 by way of communications between provisioning engine 30 and the call center's conventional outward-facing provisioning API 712, as intermediated by API layer 713. Provisioning API 712 is the programming by which traditional call center 70 accepts requests for expertise in the traditional way in which requests dial into the call center on the telephone or access it via a web page. Thus unlike in the case of the virtual call centers as discussed below, the provisioning system of this disclosed embodiment interacts with the call center platform 71 rather than with the experts 75 directly.

Software Platform Components

FIG. 1 further shows the various components of various software elements of system, collectively referred to as the expertise-provisioning platform. What follows is a brief description of some of the functionalities of those software elements. Those skilled in the art will readily be able to determine what other functionalities might be desirable for those software elements to implement, as well as what other software elements might be included in the overall expertise-provisioning system platform, in order to carry out the various functionalities disclosed herein for the overall expertise-provisioning system.

Request web application 61 includes data collection service 611, provisioning service 612 and security layer 613.

Data collection service 611 collects information about the requestor, as detailed above. (Although not shown in the FIG., some of the data collection may be performed by expertise-request tool 11.) Data collection service 611 also collects various pieces of administrative information about the session that can be used by the expertise-provisioning system for, for example, administration and analytics, this including such pieces of administrative information as duration of the session, wait time to connect, post-session ratings from the requestor etc.

Provisioning service 612 receives information from resource availability service 32 of provisioning engine 30 as to the availability and estimated wait time of remote experts, as described in further in detail hereinbelow. That information is thereupon provided to requestors' devices. Provisioning service 612 also communicates a requestor's request to master provisioning service 31 of provisioning engine 30. It also receives routing information from the master provisioning service identifying the route to connect to the identified expert using a session description protocol as known in the art, to ultimately establish a peer-to-peer connection—or alternatively, a relay server type connection—using WebRTC, for example.

Security layer 613 manages the requestors' credentials and identities as well as exchanges security tokens with security and tokening component 35.

Expert web application 62, includes security layer 621, provisioning service 622 logging & auditing service 623 and notification service 624.

Security layer 621 performs a similar function to security layer 613 but with respect to the relevant expert rather than the requestor. Provisioning service 622 makes notifications to matching remote experts about pending requests for which they have been identified as potential suppliers of the requested expertise and receives an acceptance of the request from whichever expert (if any) signaled an acceptance by, for example, pressing an appropriate button presented by remote expert interface 41 or in the web interface 43 presented on the expert's web browser. (Once an expert has accepted a request, it disappears from the devices of all the other experts who had received it.)

Provisioning service 622, similar to provisioning service 612 in request web application 61, receives connection-related information from master provisioning service 31 so that a connection between the requestor and expert can ultimately be established.

Logging & auditing service 623 maintains an awareness of expert availability and status (e.g., "available," "unavailable" and "in a call") and communicates that information to resource availability service 32.

Notification service 624 queues and manages all notifications for all users (experts for instance) and handles the delivery across modalities. For example, one expert might be notified of incoming requests directly on the expert's browser as well as via a text message. Notification service 624 can also function proactively in connection with master provisioning service 31 to send notifications to not-available experts by, for example, email, automated phone call or SMS in a case where the expertise-provisioning system recognizes that there are currently not enough experts to fulfill the current demand within some time-frame limit or that the wait time trend is upward, and it is expected that there will soon not be enough experts to fulfill future demand. Experts receiving such notifications are thus prompted to make themselves available given that there is or is expected to be an increased demand for their services.

Provisioning engine 30 includes, as already mentioned, master provisioning service 31, resource availability service 32 and security and tokening 35, which function as described above. Provisioning engine 30 also includes analytics layer 33, expert-matching rules 34 and administrative tools 36. Administrative tools 36 perform conventional types of functions for systems of this type, as will be appreciated by those skilled in the art. Analytics layer 33 determines wait times based on the workflow shown in the flowchart of FIG. 6, as described below. Analytics layer 33 may also produce other data-driven metrics required by master provisioning service 31 to identify appropriate experts to fulfill the request for a given expertise, e.g., Spanish interpretation. In particular, analytics layer 33 executes algorithms that take into account certain expert-matching rules 34 that have been specified by the system client (e.g., a hospital). Thus expert-matching rules 34 comprises a table or other data structure defining the expert-matching rules (if any) defined by each system client.

In particular, the expert-matching rules may involve such criteria as a) an identification of the expertise vendors that the system client has contracted with for the vendors' services ("authorized expertise vendors"); b) professional certifications of the available experts (e.g., "certified medical interpreter"), c) the cost per minute charged by the available experts' expertise vendor(s), and d) the current wait times for a requestor to be connected to an expert, to give just some examples. Another possible expert-matching rule may be that an expert such as a physician has a particular professional licensure. In particular, a state, e.g., a state of the United States, may require that if a person within that state is receiving medical advice from a physician during an electronic communication session, the physician must be authorized to practice medicine in the requestor's state—by being licensed by either that state or by another state through a reciprocity agreement. Thus the matching rule may be that if the requestor's state has such a requirement, a notification of a request for the expertise of a physician will be sent only to physicians who are authorized to practice medicine in the requestor's state, as would be determined from the profile of that physician maintained by the expertise-provisioning system, as described below. It is possible that some criteria for selecting experts can be incorporated either into matching rules or individual requestors may be given the opportunity to specify those criteria as metadata, as described below.

Also shown in FIG. 1 is a database DB accessible by provisioning engine 30 to store and retrieve various kinds of information including profiles of the various experts, configuration settings for system clients and call centers, credentials and personal details for various system users and other kinds of information that will be recognized by those skilled in the art as useful for implementing such a system. In particular embodiments, passwords and personal details may be encrypted and distributed into multiple disconnected datasets for security purposes, as is well known in the art. API 131 of third-party software 13 is a component of the expertise-provisioning system platform that is embedded into third-party software, such as educational software. A requestor accesses the services of the expertise-provisioning system (which in this case would more likely be, for example, the services of a subject matter expert or a healthcare expert, rather than a language interpreter) via a button displayed by API 131 within the third-party software. API 131 illustratively provides a functionality similar to that of requestor web application 61 and, as such, communicates directly with provisioning engine 30

Workflows

FIGS. 2-7 are flowcharts of workflows, and associated simplified screen views (hereafter "screens"), carried out within the expertise-provisioning system in the course of the expertise-provisioning system providing the various functionalities described herein. The functionalities shown in the flowcharts relating to interactions between the requestor devices 10-1, 10-2 . . . 10-N and request web application 61 may typically be carried out principally by request web application 61, with only a relatively smaller portion of the functionality being carried out by expertise request tool 11 or in a web interface 12 displayed on a requestor's web browser. Similarly, the functionalities shown in the flowcharts relating to interactions between the expert devices 40-1 . . . 40-N and expert web application 62 may typically be carried out principally by the request web application 62, with only a relatively smaller portion of the functionality being carried out by expert interface 41 or in the web interface 43 presented on an expert's web browser by programming, e.g., JavaScript, embedded in the web interface. Those skilled in the art will appreciate that the extent of the division of functionalities and how they are implemented is a matter of design choice for the system designer and is well within the skills of those skilled in the art.

Figure 2:
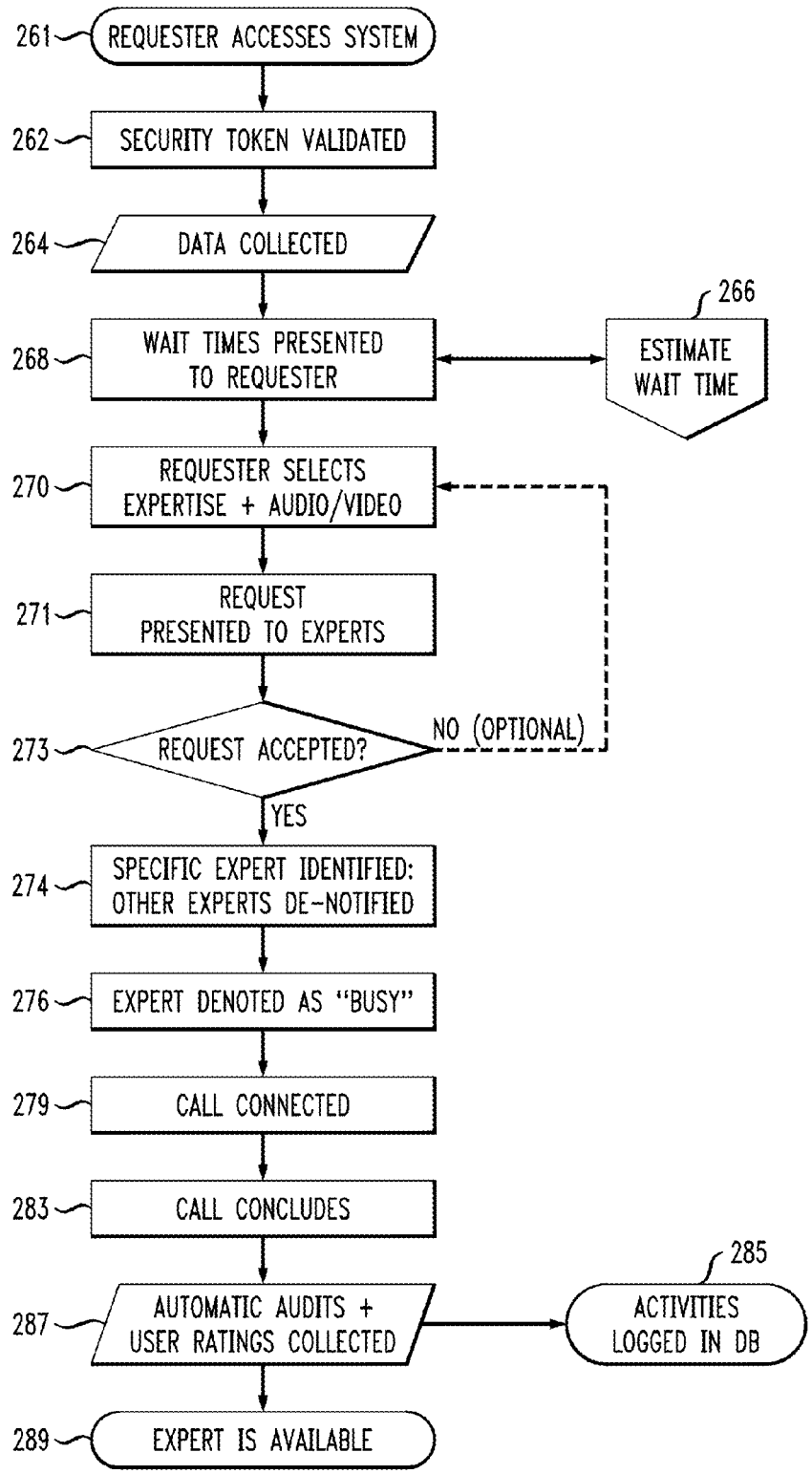
FIG. 2 is flowchart depicting an illustrative provisioning workflow performed by the illustrative expertise-provisioning system of FIG. 1.

FIG. 2 is a flowchart depicting an illustrative provisioning workflow performed by the expertise-provisioning system of FIG. 1 in order to connect a requestor to an expert.

A requestor (e.g., healthcare provider) accesses the system (at 261), by, for example, opening expertise request tool 11 or accessing a website maintained by the expertise-provisioning system. In this embodiment, the expertise-provisioning system proprietor assigns a unique URL to each system client. Requestors accessing the expertise-provisioning system via their web browsers do so by way of that particular URL, so that the expertise-provisioning system automatically becomes aware of the identity of the system client with which the requestor is associated. In the case of requestors accessing the expertise-provisioning system via expertise-request tool 11, that URL or other client-identifier is automatically embedded in the tool so that, again, the expertise-provisioning system knows which system client the requestor is associated with. In the case of third-party software 13, pressing a button displayed within third-party software by API 131 embedded therein identifies to provisioning engine 30 what the particular educational, or other third-party, software actually is, such as "Managing Your Diabetes" distributed by the (fictitious) company XYZ Medical Solutions. It can also include a data collection aspect so as to provide contextual awareness that may inform provisioning engine 30 of the particular section of the educational material is being viewed by the requestor and thus may provide additional data useful in identifying appropriate matching experts.

Given that the identity of the system client (e.g., hospital) is known, all the system needs to validate the requestor is that the requestor supplies a correct security token, e.g., password or other credentials that identify the requestor as being affiliated with that particular system client and authorized to access the expertise-provisioning system by that system client. The security token may be already known within the requestor's device and thus automatically transmitted to provisioning engine 30 or else may be prompted for. The validation is communicated by provisioning engine 30 back to request web application 61 which thereupon collects various call- and requestor-related data and metadata in any of the manners mentioned above (264).

After the requestor's security token has been validated, the requestor is illustratively presented with a screen such as shown in FIG. 3a, wherein the requestor is prompted to provide certain information about the session being requested. In this example, that information includes the hospital department ("Maternity") into which a patient for whom interpretation is needed has been admitted; the patient's hospital-assigned ID ("123456") and the patient's gender ("Female"). The various information fields may be populated by way of pull-down lists, as depicted, and/or free-form entry. In a subsequent screen (not shown) the requestor could be prompted for other metadata such as the requestor's preferred gender of the expert, a second desired expertise for the expert, or a particular professional certification. Such metadata can be used by the expertise-provisioning system when identifying appropriate experts to notify of the request, as described below.

The requestor is thereupon presented with a screen such as shown in FIG. 3b from which the requestor can select the kind of remote expert needed and whether a video or audio (only) session, or call, is desired. Three choices of expertise are presented: Spanish Interpreter, French Interpreter and Physician Consult. Those particular three choices can be chosen, for example, by the system based on past history of requests from the hospital in question, or from the particular requestor, or from the particular patient. One or more choices, such as Physician Consult, may always be presented by default. If the requestor requires an expertise not displayed, she may select an "Other Experts" button that will display further choices of languages and/or other expertises and/or a generic "help" button. For example, a patient suffering from a pulmonary disease who has recently been discharged from the hospital may be having trouble breathing. That patient may press the "help" button and thereupon be connected to a triage nurse. In a similar vein, a requestor might press a "speak to a health educator" button.

Also shown on the screen of FIG. 3b are respective estimated times that the requestor will have to wait before being connected with an expert having the desired expertise via either video or audio. These estimates will have been provided by analytics layer 33 of provisioning engine 30 in accordance with the workflow shown in the flowchart of FIG. 6, and discussed hereinbelow.

At this point, provisioning engine 30 (at 270) receives the requestor's selection of remote expertise as well as an indication from the requestor as to the desired type of communication is desired with the expert, such as audio, video or text message. In this example, the requestor has selected a Spanish interpreter video call.

Depending on the nature of the expertise requested, the requestor might be prompted on a subsequent screen (not shown) for additional metadata that may help the provisioning engine to identify an appropriate set of experts to be notified of the request and/or to provide the matching expert with information to assist the requestor. This is described in further detail hereinbelow in connection with the workflow of FIG. 7

FIG. 3b is but one example of how requestors might be presented with options for the upcoming electronic communication session. For example, instead or, or in additional to, being shown estimated wait times for different types of communication, such as audio or video, the requester might be shown options related to other criteria. For example, a requestor who has specified a preferred gender for the expert might be shown estimated wait times for both male and female experts In the meantime, various experts who have previously logged into the system are ready to accept requests by way direct communication with the expertise-provisioning system, that is without any intervening expertise-management entity such as a third-party call center platform. FIG. 4a shows a screen illustratively displayed to a particular expert who has logged into the system via remote expert interface 41 or web interface 43. and is available to receive the requestor's request. In this embodiment, the screen includes a video preview of a "head shot" of the expert—taken by a video camera associated with the expert's expert device—so that the expert can see the video of him/herself that will be displayed to a requestor once a session has been set up. As also shown, the expert has already selected an "Available" button displayed in the screen, thereby indicating that the expert is, in fact, presently available to accept and/or fulfill requests for that expert's particular expertise(s). (An "Unavailable" button is also displayed enabling the expert to indicate at some subsequent time that the expert does not want to receive requests.)

Figure 3C:
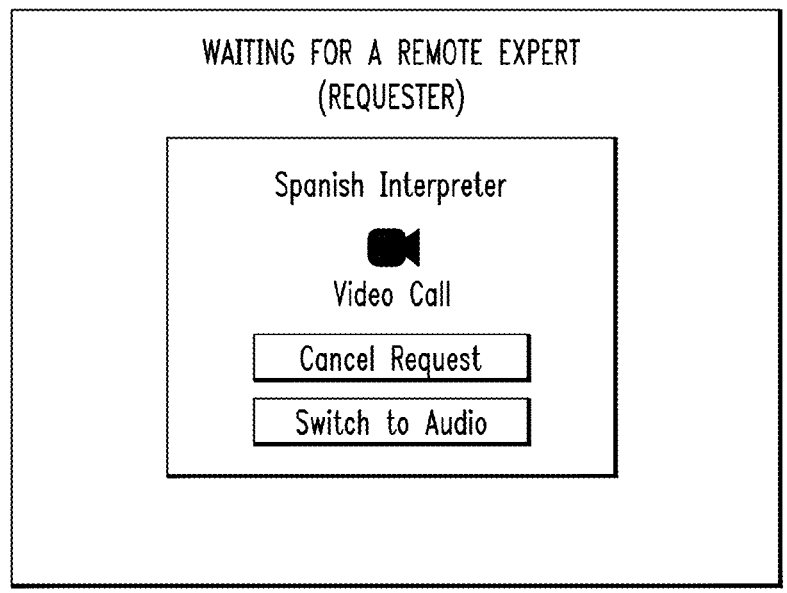
Figure 4A:
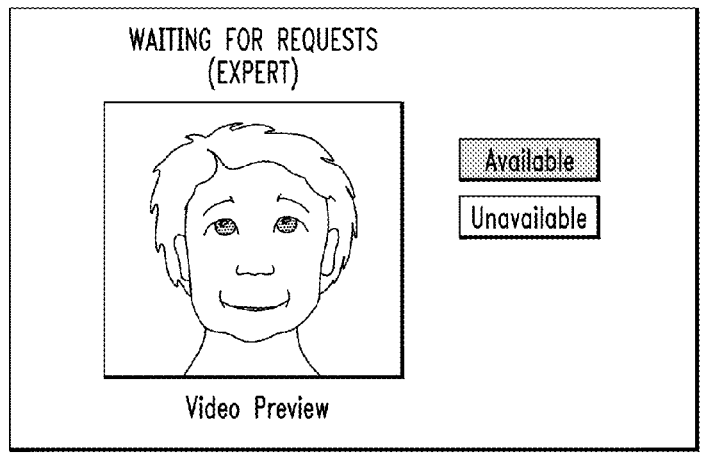
FIGS. 4a through 4c are simplified screen presentations showing an illustrative sequence of screens that may be presented on the display of a device of an expert available to provide expertise, e.g., language interpretation, via the expertise-provisioning system of FIG. 1.

After the requestor has made a selection from the screen of FIG. 3b (or some other screen that was accessed from the screen of FIG. 3b as discussed above) a screen such as FIG. 3c is presented to the requestor confirming the requestor's request and indicating that the system is waiting for a remote expert to accept the request.

Figure 4B:
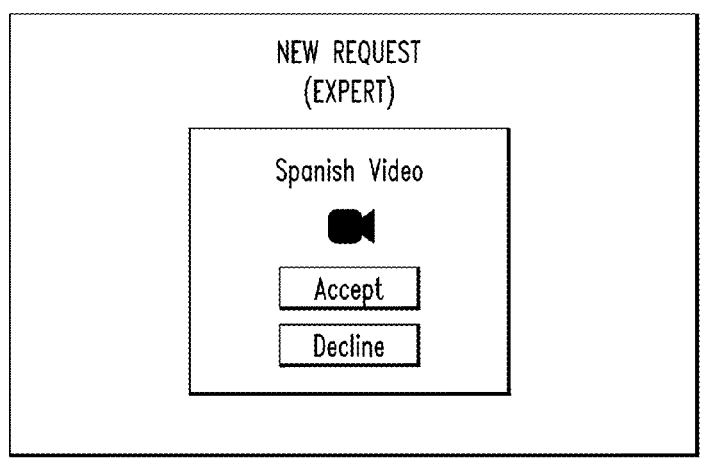

At substantially the same time, expertise-provisioning system has transmitted (271) a request notification to the expert devices of all experts who have indicated that they are "available" and who match the pending request, i.e. have been identified as potential suppliers of the requested expertise—in this case Spanish interpreters with video capability who are affiliated with particular virtual call centers and/or third-party call centers that the system client has made arrangements with, as described above. FIG. 4b shows an illustrative "New Request" screen that is thereupon displayed to all such experts.

A matching expert who wishes to accept the request will thereupon accept the request (273) by, for example, clicking on an "accept" button displayed in the screen of FIG. 4b. The acceptance is received at provisioning engine 30, which thereupon identifies the remote expert in question from information contained in the received communication (274) and at the same time returns the expert's screen to that of FIG. 4a.

It may be the case that no experts with matching expertise are logged in and have indicated that they are "available." If desired in certain embodiments, such an expert might be prompted by an SMS message, email, automated phone call (IVR), or any other desired mechanism to log in so as to be able to be connected to the requestor.

Returning for a moment to step 273, it may be that no remote expert accepted the request. It may be the case that there are no other experts available. That is, all of the available experts that the expertise-provisioning system has been administered to call upon on were already presented with the request at 271. In that case, the workflow waits at 273 for a matching expert to accept. Alternatively, the workflow returns to 270 responsive to the requestor, seeing that no expert is immediately available, modifying the request (at 270), such as by changing the request from video to audio.

On the other hand, there may be other experts that the expertise-provisioning system has been administered to send a request notification to, per the system client's expert-matching rule(s) 34. For example, the expert-matching rule may be to send request notifications in the first instance only to in-house experts (in the first-party virtual call center) unless the estimated wait time to do so exceeds a wait time specified in the expert-matching rule(s). If for any reason, none of the original matching group accept the request within the time threshold, then the experts of a third-party virtual call center with whom the system client has contracted should thereupon be sent a notification request. In that case the workflow again presents the request (at 271) but to the matching experts of that particular third-party virtual call center. This workflow can repeat any number of times until a remote expert accepts the request at 273 or the requestor abandons the request, e.g., hits a "cancel" button. Alternatively, the system may use predictive analytics to estimate the wait time for a matching first party expert, and proactively route the request to a third-party virtual call center because the first party experts are expected to exceed the time threshold.

Once a specific remote expert has been identified at 274, provisioning engine 30 sets a flag or otherwise denotes (276) that that particular remote expert is "in a call" so that the expertise-provisioning system will regard that remote expert as being unavailable when carrying out subsequent expert-matchings in response to subsequent requests.

Figure 3D:
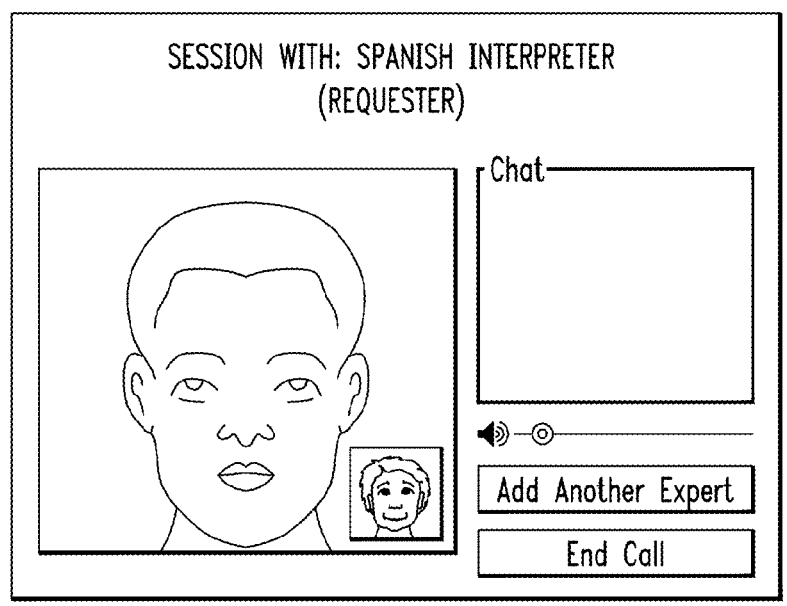
Figure 4C:
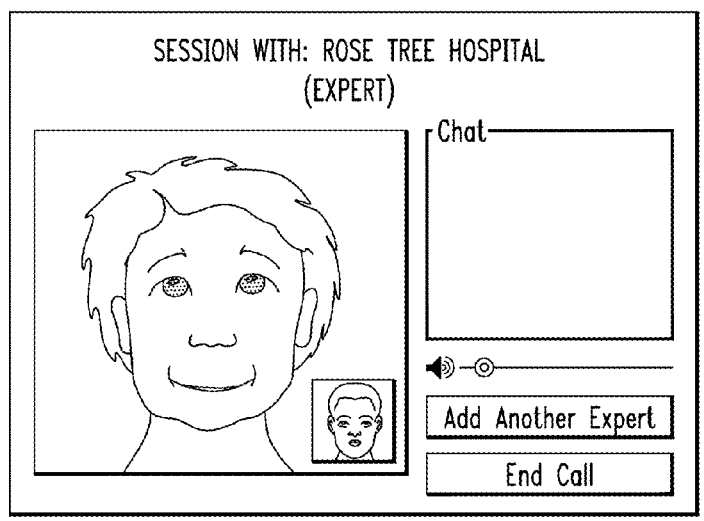

At this point, the requestor is enabled to be in electronic communication with the accepting expert. To this end, the remote expertise session is illustratively connected peer-to-peer using a service like WebRTC (279) as previously described. In certain cases, typically at the request of customers with specific networking requirements, communication may involve a secure relay server as a supplement to peer-to-peer interactions. FIGS. 3d and 4c show the screens illustratively presented to the requestor and the expert, respectively, at this time. The requestor (expert) is presented with the video being generated by the expert's (requestor's) device's camera which will be a head shot of the expert (requestor) if s/he is sitting in front of the camera. The requestor and the expert each see an inset video of themselves. The expert's screen illustratively includes a legend identifying the requestor—illustratively the requestor's organization ("Rose Tree Hospital") The video session typically includes audio as well but a two-way chat window is also available for the requestor and expert to communicate by text. Selecting an "Add Another Expert" button presented to both the requestor and the expert allow either of them to add another expert to the session, which is readily accomplished the service by which the remote expertise session is connected, such as the WebRTC protocol. For example, a requestor who speaks English as a second language may have thought that she was fluent enough to conduct a session with an English-speaking physician or other expert, only to discover that the services of a language interpreter are needed. By selecting the "add another expert" button, the requestor of this example, would be led to a screen such as that of FIG. 3b—perhaps in a window overlaid or next to a window in which the already-in-progress session is displayed—with the added-in expert ultimately appearing in that window. Selecting an "End Call" button presented to both the requestor and the expert allow either of them to end the session.

Once the session concludes (at 283), the expertise-provisioning system performs automatic audits (at 287) by, for example, collecting data on, connection duration, wait time, party that terminated the session, etc. Also collected are user satisfaction ratings. Both the requestor and the expert may be asked to rate the quality of the connection, level of satisfaction with wait time, etc. The requestor may also be asked to rate the quality of service provided by the expert. These are logged in a database (285) and are used for future provisioning and administrative reporting. Finally, the status of expert in question is reset to "available" (289).

The workflow of FIG. 2 applies to the connecting of requestors to experts wherein the experts are either in virtual call centers or are "behind" a traditional call center such as call center 70. The virtual call center scenario involves conventional types of processing and communications among the various disclosed software elements of the overall expertise-system software platform in implementing the principles of the present invention. As to the traditional call center scenario, a further word about an illustrative implementation may be helpful. In particular, assume that platform 71 is one that employs the communications protocol referred to as SIP (Session Initiation Protocol). Using that protocol, platform 71 can indicate to provisioning engine 30 the availability of ones of its remote experts 75. Once provisioning engine 30 has determined that the traditional call center 70 meets the request—and assuming that the requestor has requested an audio connection, provisioning engine 30 generates an SIP call to the call center, the call containing per the SIP protocol data such as the language requested. If an appropriate one of the experts 75 is identified by platform 71 as being able to fulfill the request, platform 71 completes an audio connection between the identified one of experts 75 and provisioning engine 30. The latter then connects audio from the SIP-based system to web audio (such as WebRTC) and vice versa so that endpoints from traditional telephones and web-enabled endpoints can interact with each other in furtherance of the remote expertise communication session. Further, the system broadcasts information about the request via SIP header or similar mechanism to inform the traditional call center of requested expertise and other information.

FIG. 5 is a flowchart of the workflow by which provisioning engine 30 uses the request-specific information and, possibly, one or more expert-matching rules specified by the expertise-provisioning system client on behalf of its authorized requestors, to identify matching experts. At the center of the workflow is the creation of a request profile 511. The request profile is matched against available remote expert(s), the matching remote experts are notified of the request and ultimately one remote expert accepts the request.

In particular, the request profile is a collection of data gathered from a number of sources. That data illustratively includes one or more of: data contained in the expertise request itself (506), including type of expertise requested or urgency of the request; metadata about, for example, the patient and/or the requestor that was collected (501) by expertise request tool 11 or web interface 12 (FIG. 1), such metadata including requestor's role in the organization or demographic information about the patient; similar metadata that may have been collected (503) by a third-party web application or software, as described hereinabove; and a database DB (also shown in FIG. 1) containing previously collected data about, for example, the patient and/or the requestor, as well as other information including that mentioned hereinabove in connection with the description of FIG. 1.

One or more remote expert groups are now identified (514) in accordance with predefined criteria. Illustratively two remote expert groups are identified—a first tier remote expert group and a second tier remote expert group—although any number of tiers is possible. The experts of all the groups must meet the criteria specified by the request and its metadata, including the expertise requested, virtual call center and/or third-party call center affiliations, price constraints, etc. The difference between the experts in the individual tiers is that the first tier remote expert group are individual remote experts and/or third-party call centers who not only meet request criteria, but also fulfill certain of the matching rules 34, specified by the system client (e.g. hospital) on behalf of its authorized requestors which will cause those experts to be the first notified of the request, and thus the first who are given a chance to accept it, ahead of other experts. Those experts are put into the first tier remote expert group and all the other matching experts will be put into the second tier remote expert group. For example, a matching rule may be that the expert provisioning system should notify experts within the system client's own "first party" virtual call center—i.e. experts who are employed by the system client itself—unless the estimated wait time exceeds some predetermined time. Another possible matching rule might be that the expert provisioning system should notify lowest-cost experts unless the estimated wait time exceeds some predetermined time.

Looking then at the flowchart, it is seen that if the actual expected wait time is within the matching-rule-specified time limit, (519) then only the first tier remote expert group is notified of the request (520). A first-tier expert may thereupon accept the request (524) within the matching-rule-specified time limit. On the other hand, once the actual wait time exceeds the matching-rule-specified time limit (523)—that is, the actual wait time turned out to exceed that which had been estimated with any remote expert from the first tier having accepted the request—then the second tier experts are notified and, ultimately, an expert from one or the other of the tier will accept the request unless, at some point, the requestor does not want to wait any longer and cancels the request and possibly initiates a new request e.g., one with a different media type. See the NO (OPTIONAL) branch out of step 273 in FIG. 2.

Returning to 519, it may be that the expected wait time exceeds the matching-rule-specified time limit, in which case the experts of both the first and second tiers will be notified (520 and 521) immediately rather than seriatim.

Figure 6:
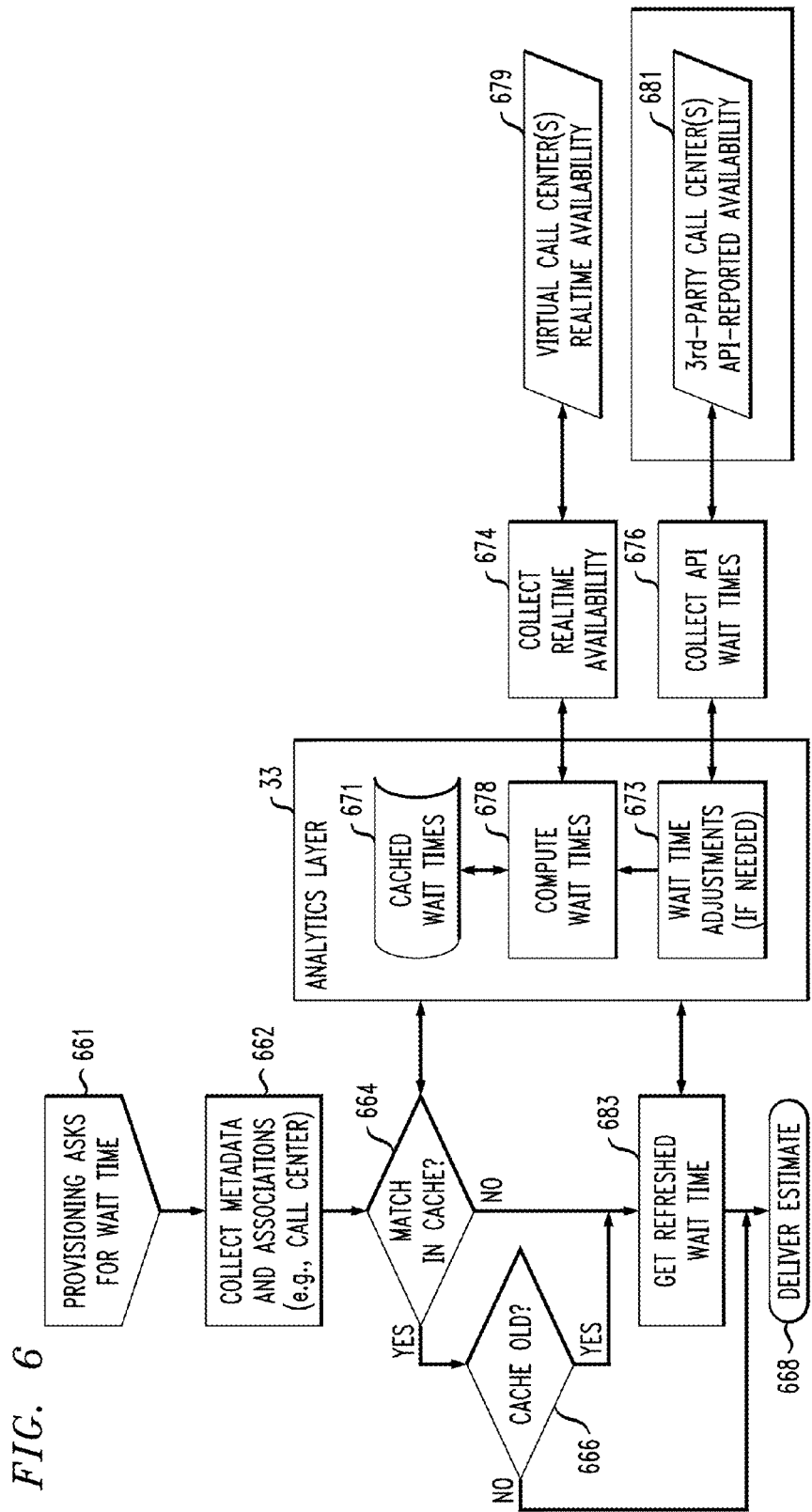
FIG. 6 is flowchart depicting an illustrative resource availability workflow performed by the illustrative provisioning system of FIG. 1.

More generally, matching rules 34 can be thought of as a set of linear decision points. For example, first prioritize on wait times at all costs, then prioritize to the least expensive resources available, then find an expert of the gender preferred by requester. So going through such a decision process, one might group remote experts into any number of tiers, as noted above, rather than only two tiers. For example, one might group remote experts who match perfectly into the first tier, meaning that all the applicable matching rules are met; wait 30 seconds for one of them to respond before notifying the second tier, in which the experts match the matching rules to a large extent; then wait another 30 seconds for an expert from either the first or second tiers before notifying a third tier whose experts match the matching rules to at least some extent; then wait another 30 seconds for an expert from any of the first, second or tiers before notifying a fourth tier whose experts do not match any of the matching rules while still at least meeting the criteria specified by the request and its metadata, FIG. 6 is flowchart depicting an illustrative resource availability workflow performed by the illustrative provisioning system of FIG. 1 and, in particular, resource availability service 32 (FIG. 1). In overview, in order to give a wait time estimate to a customer extremely quickly, the system first checks to see if it has estimated a similar wait time for another requestor within some preselected time period and, of so, it uses that prior estimate as the estimate presented to the present requestor. This saves processing cycles and database queries, speeding up the system. If such a prior estimate is not available, the system makes a new estimate.

In particular, provisioning service 612 requests (661) resource availability service 32 to provide information as to the wait time for a remote expert and communication medium (e.g., video or audio) in order to be able to display same on the screen of FIG. 3b, for example. Metadata about that request is collected (662), the metadata including, for example, the expertise for which availability is are needed and an identification of the authorized call centers for this requestor. (Note from FIG. 3b, for example, that typically a number of wait times will have to be requested and thus the workflow of FIG. 6 will be executed for each of them.

Analytics layer 33 maintains a cache 671 of recently estimated wait times. If a cached wait time for the request at hand is available (664), and if the cached information is not too old (666) based on a predefined time window, then the cached estimate is delivered to provisioning service 612 for use in presenting wait times to the requestor (see FIG. 3b).

On the other hand, if there is no match in the cache (664) or the cache information is too old (666), then a refreshed wait time is requested (683) from analytics layer 33. Resource availability service 32 keeps track in real time of the availability (679) of each of the experts in each of the virtual call centers and collects that information (674). Since the expertise provisioning system does not have direct access to the experts of the third-party call centers, it must rely on wait time information supplied by the third party call centers via API (681) and that information is collected (676) from all the third-party call centers. In embodiments where the proprietor of the expertise provisioning system is concerned about the accuracy of wait times reported by one or more of the third-party call centers, analytics layer 33 may adjust (673) the wait time reported by a third-party call center based on observed discrepancies between wait times reported by that third-party call center in the past and actual wait times that eventuated. Analytics layer 33 uses a) the (possibly adjusted) wait times reported by the third-party call centers, b) the virtual call center experts' availabilities collected by the resource availability service and c) historical wait time data, to compute (678) a wait time estimate for the request. The estimate is cached in 671 and supplied to resource availability service 32 (683) which, in turn, delivers the estimate to master provisioning service 31 (668).

As noted above, information other than the nature of the expertise and the preferred communication medium (e.g., video/audio) may be collected from the requestor prior to the request being sent to available experts in order to help the provisioning engine identifying an appropriate set of available experts and/or to provide the matching expert with information to assist the requestor. The collection of such metadata is part of step 264 (FIG. 2) and it is envisioned that screen(s) that collect such data (not shown in the FIGS.) would be presented to the requestor after the screen of FIG. 3b and before the screen of FIG. 3c.

For example, if the request is for a physician contact, the requestor—who might be, for example, a healthcare provider at the bedside of patient—might be prompted to input particular metadata such as the patient's blood pressure before the system moves ahead to notify potential experts of the request. As another example, if a request is to be made to a dietary planning expert, a data collection field might ask if the requestor is vegetarian. Or if the request is to be made to a behavioral health specialist, the requestor might be asked to answer a set of basic questions to see if a suicide intervention is needed, in which case the request notification might be limited to experts with suicide intervention training. Another possibility might be for the system to prompt the requestor on such a subsequent screen to upload a document stored on, or accessible to, the requestor's device such as an electrocardiogram.

Figure 7:
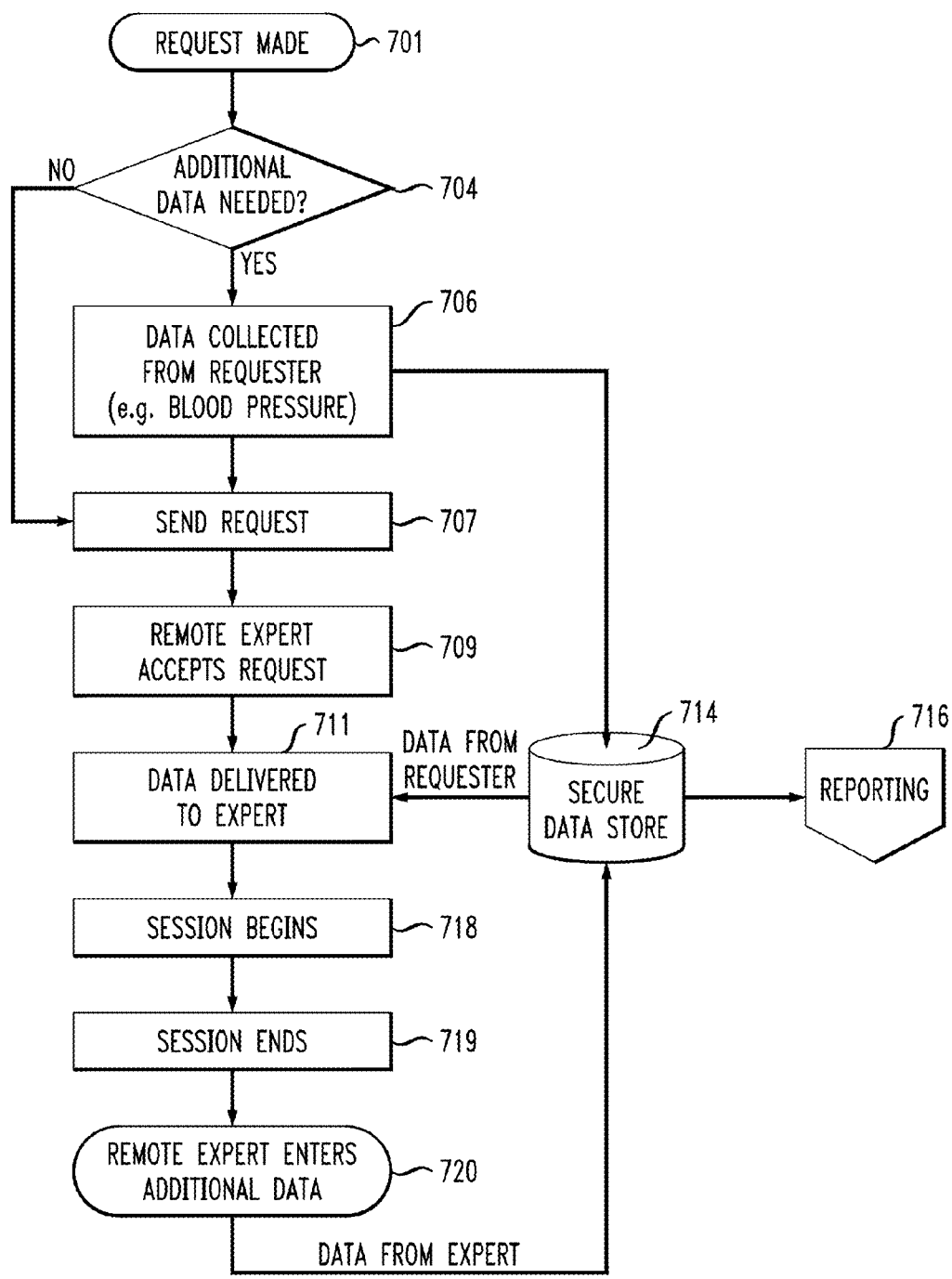
FIG. 7 is a flowchart depicting an illustrative workflow by which certain data may be supplied by a requestor as part of the requesting process.

FIG. 7 shows an illustrative workflow by which such metadata collection can be implemented. The request having been made (701) it is determined (704) whether additional data needs to be gathered based on criteria such as those mentioned above. If not, the request is sent (707) to the appropriate experts as described hereinabove. If additional data does need to be gathered, then appropriate screens are presented to the requester to collect that data (706). The data is stored in a secure data store 714 and then the request is sent (707). Once a remote expert accepts the request (709), the data is delivered (711) to the expert through a secure web interface and displayed to the expert in any desired manner, such as side-by-side with a window containing the communication session or under a separate tab. The data is also placed (716) into a reporting data repository for that session for viewing by authorized administrative personnel at customers.

The session then begins (718) and after it ends (719) the remote expert has the option to enter additional data into data store 714 via a screen (not shown) presented to the expert after the session has ended.

Other embodiments might provide for the interchange of data between the requestor and the expert while the session is in progress.

Conclusion

The foregoing merely Illustrates the principles of the invention.

For example, at its core, the expertise-provisioning system is an exchange model for brokering relationships between those seeking remote expertise, and qualified remote experts. These include language interpretation that may or may not be invoked in a healthcare setting; healthcare scenarios that may or may involve language interpretation including remote health coaching, dietary guidance, post-acute rehabilitation, nurse triage and behavioral health counseling; and law enforcement scenarios involving remote forensic interviews when special expertise is required, such as when dealing with children and cognitively impaired witnesses. More generally, the disclosed expertise-provisioning system can be used in any realm where it is desired to provide a user with remote access to a live individual with specialized expertise.

In addition, the embodiment assumes a particular source language, e.g., English, is the spoken language of requestors, so that a request for a Spanish language expert, for example, is fulfilled by identifying matching experts who can interpret between Spanish and English. In other embodiments, however, a requestor may be able to specify her source language, e.g., German, so that the request for a Spanish language expert will be fulfilled by identifying an expert who can interpret between Spanish and German.

The specific hardware and software structures and arrangements and their particular functionalities, workflows and modes of operation that are described herein merely illustrate one of a large number of possible alternative structures and arrangements that those skilled in the art will be able to devise in order to implement the principles of the present invention.

It will thus be appreciated that those skilled in the art will be able to devise numerous arrangements which, although not explicitly shown or described herein, embody the principles of the present invention and are thus within its spirit and scope.

The invention claimed is:

1. A method for use in a expertise-provisioning system, the method comprising:
   storing information about experts including, for each of the experts, at least one organizational affiliation of the expert, and at least one type of expertise possessed by the expert;
   receiving a first request for an expert from a requestor affiliated with an organization, the first request specifying at least one type of expertise;
   identifying matching in-house experts (A) having expertise matching the specified expertise, and (B) having an affiliation to the organization that the requestor is affiliated with;
   if at least one matching in-house expert exists, electronically connecting the requestor with one of the matching in-house experts; and
   if at least one matching in-house expert does not exist, electronically connecting the requestor with one of the experts having expertise matching the specified expertise and an affiliation to an organization other than the organization that the requestor is affiliated with.

2. The method of claim 1, wherein the step of identifying also includes (C) having a wait time estimate under a predetermined time.

3. The method of claim 1, wherein the stored information for each expert also includes an availability indicator, and further comprising:
   when the expertise-provisioning system determines that demand for a particular type of expertise is strong, sending a demand notice to an expert having (i) the particular type of expertise and (ii) its availability indicator set to unavailable, the demand notice stating that there is strong demand for the particular type of expertise.

4. The method of claim 1, wherein the first request is associated with a client identifier assigned by the expertise-provisioning system, the client identifier being associated with the organization that the requestor is affiliated with.

5. The method of claim 1, further comprising, prior to the step of receiving a first request,
   presenting choices of types of expertise to the requestor; and
   wherein the type of expertise specified in the first request is one of the presented choices.

6. The method of claim 1, further comprising:
   when at least one matching in-house expert does not exist, sending a message from the expertise-provisioning system to a third-party call center, the message specifying at least one type of expertise;
   receiving, from the third-party call center, information about experts accessible through the third-party call center that match the specified expertise; and
   wherein the step of electronically connecting the requestor connects the requestor with one of the experts accessible through the third-party call center that match the specified expertise.

7. The method of claim 1, further comprising:
   when at least two matching in-house experts exist, offering the requestor a choice of the at least two matching in-house experts;
   receiving, from the requestor, a selection of one of the at least two matching in-house experts; and
       wherein the step of electronically connecting the requestor connects the requestor with the selected matching in-house expert.

8. The method of claim 7, wherein the step of offering includes a wait time estimate for each of the at least two matching in-house experts.

9. The method of claim 8, wherein the wait time estimate is based on a previously provided wait time estimate for another requestor.

10. The method of claim 8, wherein the stored information for each expert also includes an availability indicator, and wherein the wait time estimate is based on the availability indicators for the at least two matching in-house experts.

11. The method of claim 7, further comprising, prior to the step of electronically connecting the requestor,
    presenting an invitation to the selected matching in-house expert to provide expertise; and
    receiving an acceptance, responsive to the invitation, from the selected matching in-house expert.

12. The method of claim 1, further comprising:
    when at least two experts having expertise matching the specified expertise exist, offering the requestor a choice of the at least two experts having expertise matching the specified expertise;
    receiving, from the requestor, a selection of one of the at least two matching experts; and
        wherein the step of electronically connecting the requestor connects the requestor with the selected matching expert.

13. The method of claim 12, wherein the step of offering includes a wait time estimate for each of the at least two matching experts.

14. The method of claim 13, wherein the wait time estimate is based on a previously provided wait time estimate for another requestor.

15. The method of claim 13, wherein the stored information for each expert also includes an availability indicator, and wherein the wait time estimate is based on the availability indicators for the at least two matching experts.

16. The method of claim 12, further comprising, prior to the step of electronically connecting the requestor, presenting an invitation to the selected matching expert to provide expertise; and receiving an acceptance, responsive to the invitation, from the selected matching expert.

17. The method of claim 1, further comprising, prior to the step of electronically connecting, sending invitations to provide expertise to each of the matching in-house experts; and wherein the step of electronically connecting connects the requestor with one of the experts receiving an invitation that accepted soonest.

18. The method of claim 17, further comprising, after the step of sending invitations and prior to the step of electronically connecting, waiting for a predetermined time without receiving an acceptance from any of the matching in-house experts; and sending invitations to provide expertise to experts having expertise matching the specified expertise and an affiliation to an organization other than the organization that the requestor is affiliated with.

19. The method of claim 1, wherein the step of electronically connecting uses a WebRTC service.

20. The method of claim 1, further comprising, after the step of electronically connecting, receiving a second request from the requestor for an expert having a different type of expertise than specified in the first request; and electronically connecting the requestor with a second expert having expertise matching the expertise specified in the second request while the requestor is connected with the expert having expertise matching the expertise specified in the first request.

* * * * *